United States Patent
Wang-Lee

(10) Patent No.: US 6,618,901 B1
(45) Date of Patent: Sep. 16, 2003

(54) EYEGLASS TEMPLES WITH ANGLE ADJUSTMENT ARRANGEMENTS

(75) Inventor: Tzu-Feng Wang-Lee, Tainan (TW)

(73) Assignee: Chen Li Optical Co., Ltd., Tainan (TW)

( * ) Notice: Subject to any disclaimer, the term of this patent is extended or adjusted under 35 U.S.C. 154(b) by 0 days.

(21) Appl. No.: 10/137,175

(22) Filed: May 2, 2002

(51) Int. Cl.[7] .............. G02C 5/22; G02C 5/14; E05D 7/04; E05D 7/06
(52) U.S. Cl. .............. 16/228; 16/240; 16/245; 351/120
(58) Field of Search .............. 16/228, 240, 245; 403/92, 97; 351/120, 153

(56) References Cited

U.S. PATENT DOCUMENTS

| | | | | |
|---|---|---|---|---|
| 4,527,291 A | * | 7/1985 | Nussbickl | 2/450 |
| 5,565,937 A | * | 10/1996 | Lee | 351/120 |
| 5,638,147 A | * | 6/1997 | Wang-Lee | 351/120 |
| 5,760,867 A | * | 6/1998 | Pernicka et al. | 351/120 |
| 5,820,288 A | * | 10/1998 | Cole | 403/97 |
| 5,980,038 A | * | 11/1999 | Chen | 351/120 |
| 6,086,200 A | * | 7/2000 | Wang-Lee | 351/120 |
| 6,099,120 A | * | 8/2000 | De Lima | 351/153 |
| 6,364,479 B1 | * | 4/2002 | Wu | 351/120 |
| D458,293 S | * | 6/2002 | Lee | D16/314 |
| 6,467,902 B2 | * | 10/2002 | Wang-Lee | 351/120 |

* cited by examiner

Primary Examiner—Lloyd A. Gall
Assistant Examiner—Michael J. Kyle
(74) Attorney, Agent, or Firm—Alan D. Kamrath; Rider Bennett, LLP

(57) ABSTRACT

Angle adjustment arrangements for eyeglass temples are provided in which each arrangement comprises an end-piece of frame including a recess and an opening; a connection mechanism received in the recess and including first and second circularly shaped bifurcated ends and a first series of serrations on an inner wall of first circularly shaped bifurcated end; and a fastening mechanism received in the opening and including a second series of serrations formed on an inner shank; and a temple secured to the connection mechanism wherein a ridge of second series of serrations is interfitted into a space between adjacent ones of first series of serrations for pivotably securing connection and fastening mechanisms together, thereby allowing temple to be pivoted with respect to end-piece in an operating state.

1 Claim, 4 Drawing Sheets

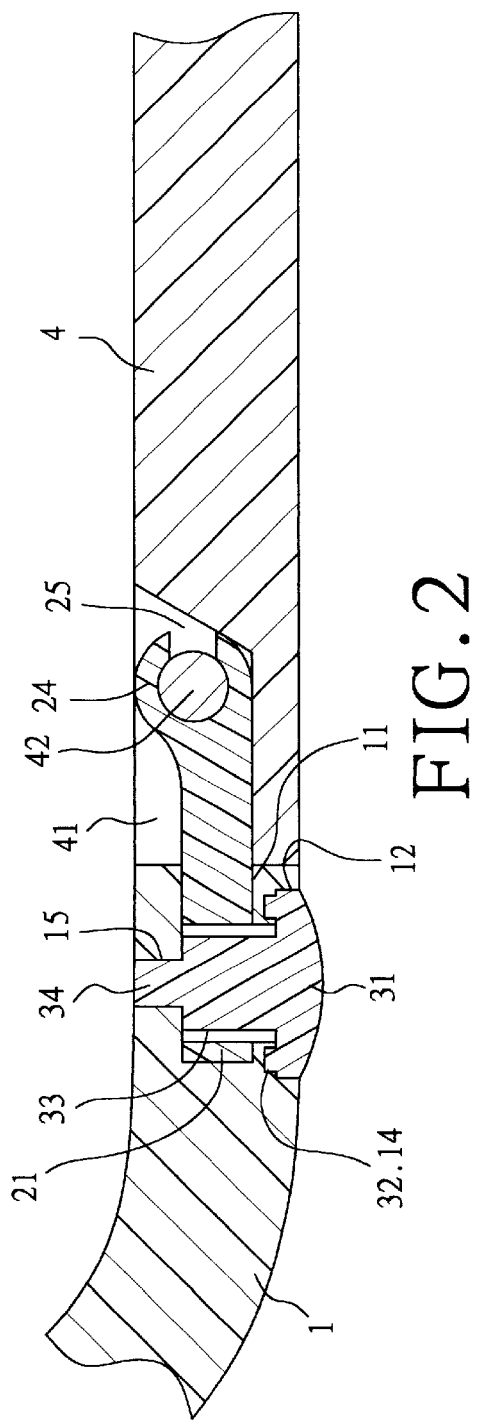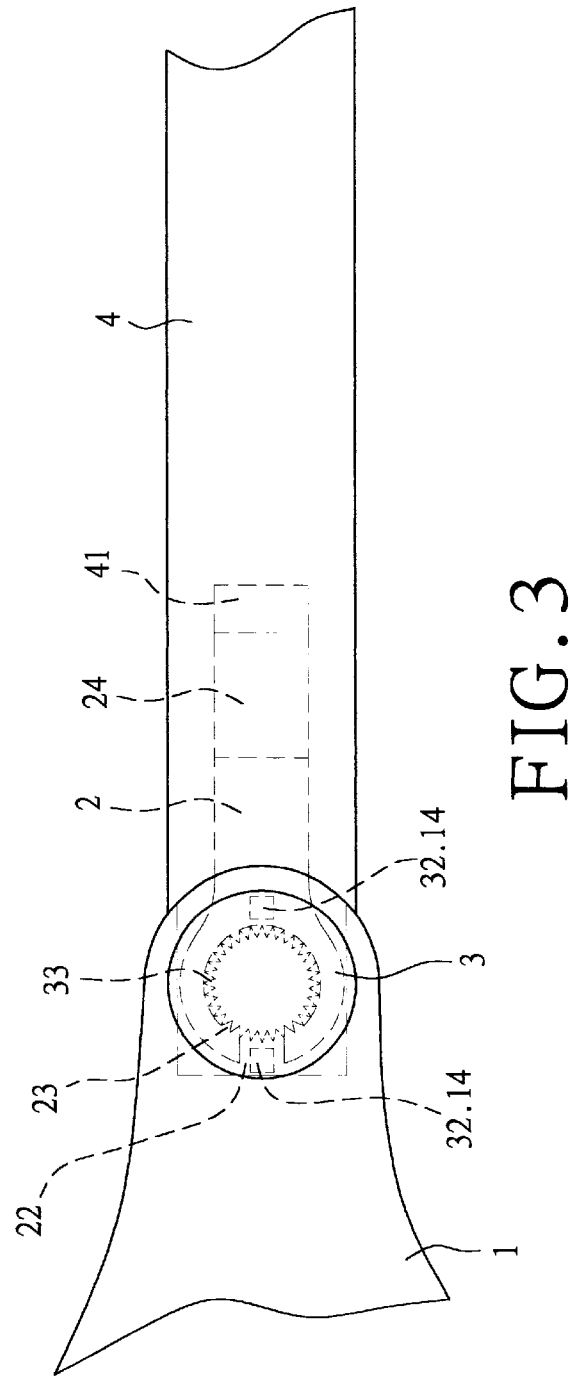
FIG. 2
FIG. 3

EYEGLASS TEMPLES WITH ANGLE ADJUSTMENT ARRANGEMENTS

FIELD OF THE INVENTION

The present invention relates to adjustable temples for eyeglasses and more particularly to eyeglass temples with improved angle adjustment arrangements.

BACKGROUND OF THE INVENTION

For being adapted to fit different individuals with various head sizes, many conventional eyeglasses are equipped with adjustable temples in which some of them use complicated mechanisms for adjusting and holding temples in the adjusted position. In addition, such conventional eyeglasses are disadvantageous for being expensive to manufacture, unreliable, and complicated in assembly.

Thus, it is desirable to provide improved eyeglass temples with angle adjustment arrangements in order to overcome the above drawbacks of prior art.

SUMMARY OF THE INVENTION

It is an object of the present invention to provide angle adjustment arrangements for temples of a pair of eyeglasses, each arrangement comprising an end-piece at either end of an eyeglass frame, the end-piece including a recess, an opening open to an outer surface and perpendicular to the recess, an internal channel having a diameter smaller than that of the opening being in communication with the recess, two opposite slots on a shoulder between the opening and the channel, and an aperture in the channel coaxial with both the channel and the opening; a connection mechanism including a first circularly shaped bifurcated end having two side pieces spaced apart, a first series of serrations on an inner wall of the first circularly shaped bifurcated end, and a second circularly shaped bifurcated end having two side pieces spaced apart, and the second circularly shaped bifurcated end being opposite and perpendicular to the first circularly shaped bifurcated end; a fastening mechanism including an outer circular flange, two opposite tabs on an inner surface of the flange, a second series of serrations formed on a circumference of a shank extended inwardly from the flange, and a shaft extended from an inner end being coaxial with the second series of serrations; and a temple including a groove at a front end and a circular post in the groove; wherein in assembly snap the second circularly shaped bifurcated end into the groove to cause the side pieces of the second circularly shaped bifurcated end to cling around the post for securing the connection mechanism and the temple, snap the first circularly shaped bifurcated end into the recess, and snap the fastening mechanism in the opening with the tabs secured in the slots, the second series of serrations received in the channel, and the shaft clung into the aperture for interfitting one of ridges of the second series of serrations into a space between adjacent ones of the first series of serrations so as to pivotably secure the connection and the fastening mechanisms together, thereby allowing the temple to be pivoted with respect to the end-piece in an operating state.

The above and other objects, features and advantages of the present invention will become apparent from the following detailed description taken with the accompanying drawings.

BRIEF DESCRIPTION OF THE DRAWINGS

FIG. 2 is a top cross-sectional view of the FIG. 1 assembled arrangement;

FIG. 3 is a side view of FIG. 2 with portions shown in phantom lines;

DETAILED DESCRIPTION OF THE PREFERRED EMBODIMENTS

Figure 1:
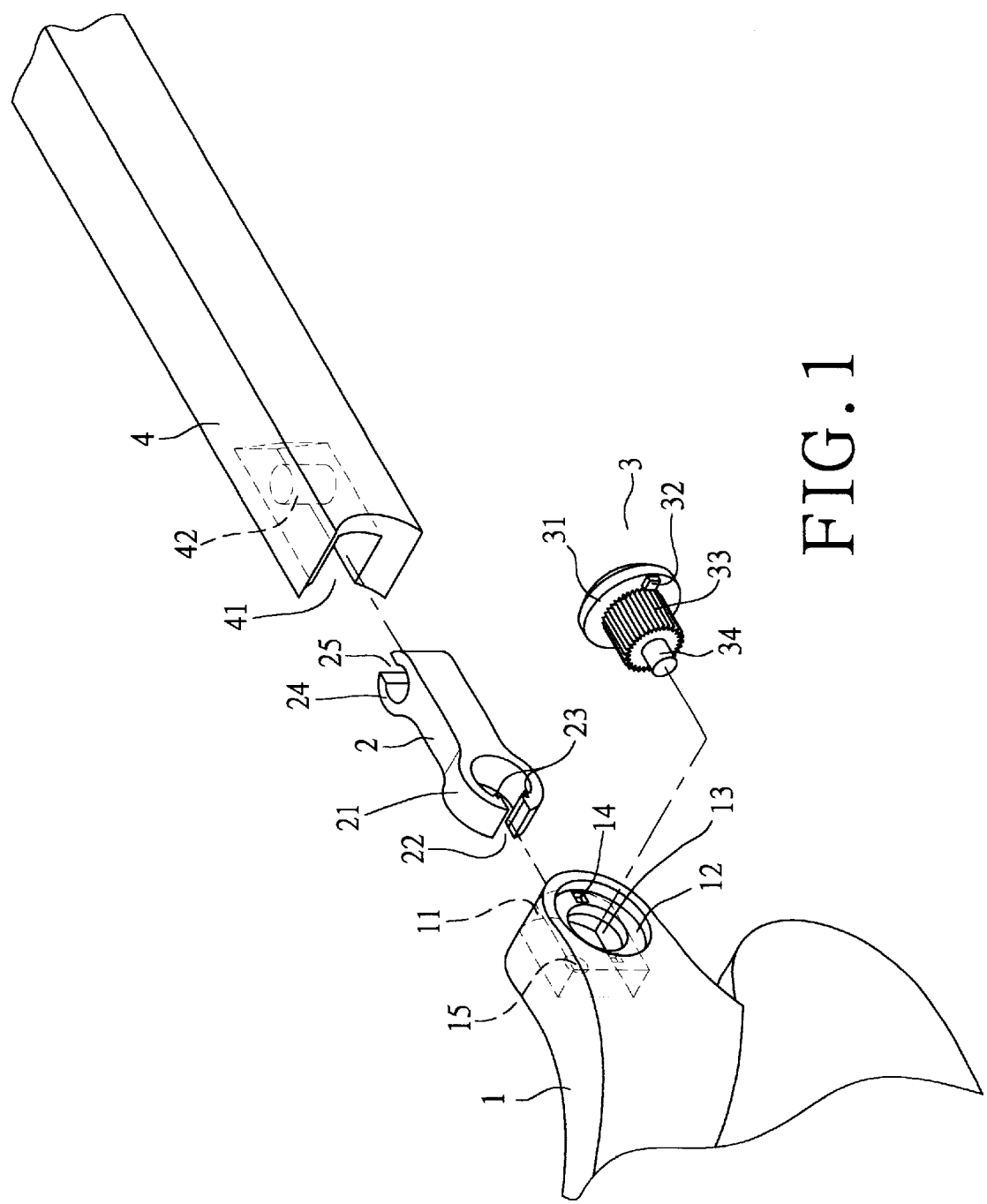
FIG. 1 is an exploded view of an arrangement for adjusting an angle of eyeglass temple according to the invention where portions shown in phantom lines.

Referring to FIG. 1, there is shown an arrangement for adjusting an angle of eyeglass temple in accordance with the invention. The arrangement comprises an end-piece 1 at either end of eyeglass frame, the end-piece 1 including a recess 11, an opening 12 open to an outer surface and perpendicular to the recess 11, an internal channel 13 having a diameter smaller than that of the opening 12 being in communication with the recess 11, two opposite slots 14 on a shoulder between the opening 12 and the channel 13, and an aperture 15 in the channel 13 coaxial with both the channel 13 and the opening 12; a connection mechanism 2 including a first circularly shaped bifurcated end 22 having two side pieces 21 spaced apart, a series of serrations 23 on an inner wall of the first circularly shaped bifurcated end 22, and a second circularly shaped bifurcated end 25 having two side pieces 24 spaced apart, the second circularly shaped bifurcated end 25 being opposite and perpendicular to the first circularly shaped bifurcated end 22; a fastening mechanism 3 including an outer circular flange 31, two opposite tabs 32 on an inner surface of the flange 31, a series of serrations 33 formed on a circumference of an inward projection of the flange 31, and a shaft 34 extended from an inner end being coaxial with the series of serrations 33; and a temple 4 including a groove 41 at a front end and a circular post 42 in the groove 41.

Referring to FIGS. 2 and 3, an assembly process of the invention will now be described below. First, snap the second circularly shaped bifurcated end 25 into the groove 41 to cause the side pieces 24 to cling around the post 42 due to a flexibility of the deformed side pieces 24. Thus, the connection mechanism 2 and the temple 4 are secured together. Then, snap the first circularly shaped bifurcated end 22 into the recess 11 due to a flexibility of the deformed side pieces 21. Next, snap the fastening mechanism 3 in the opening 12 with the tabs 32 secured in the slots 14, the series of serrations 33 received in the channel 13, and the shaft 34 clung;into the aperture 15. Further, a ridge of the series of serrations 33 is interfitted into a space between adjacent ones of the series of serrations 23. Thus, the connection and the fastening mechanisms 2 and 3 are pivotably secured together.

Figure 4:
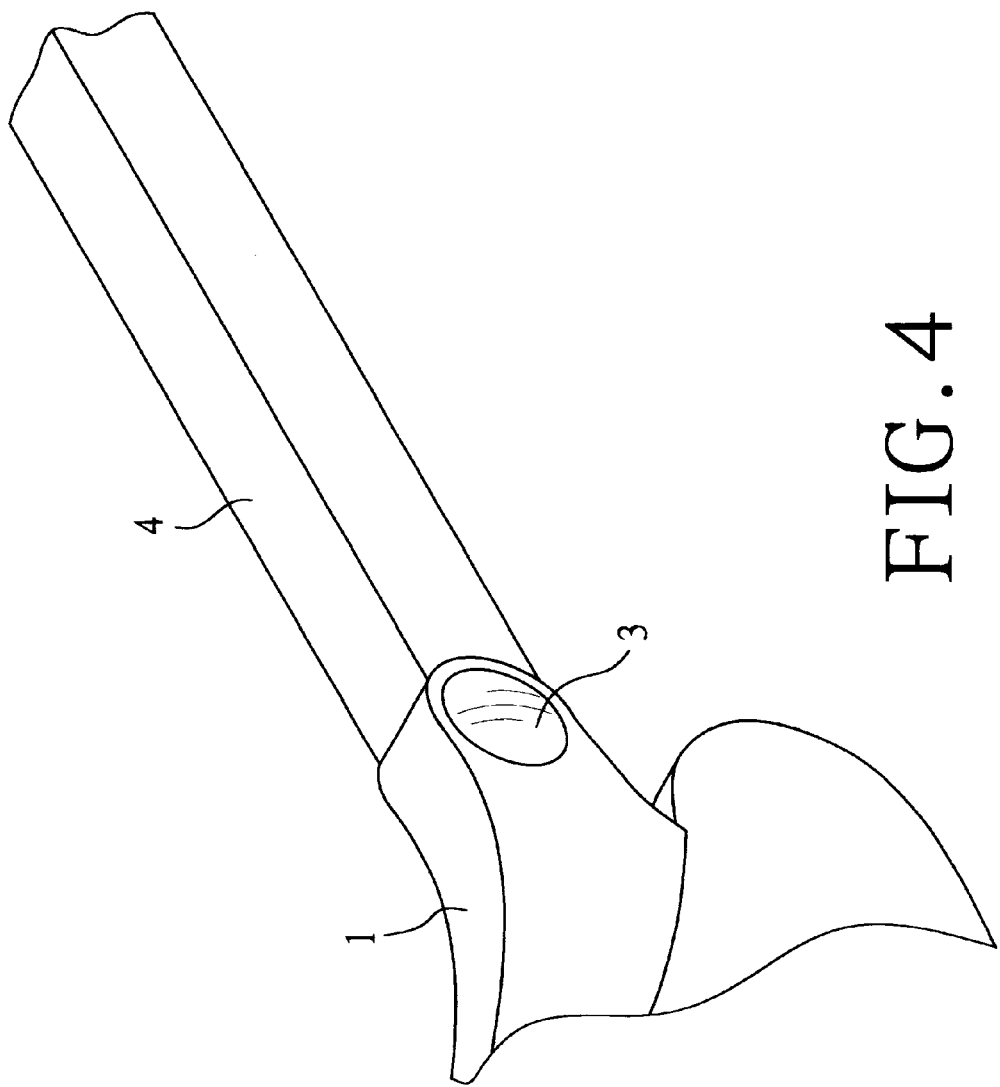
FIG. 4 is a perspective view of FIG. 2.
Figure 5:
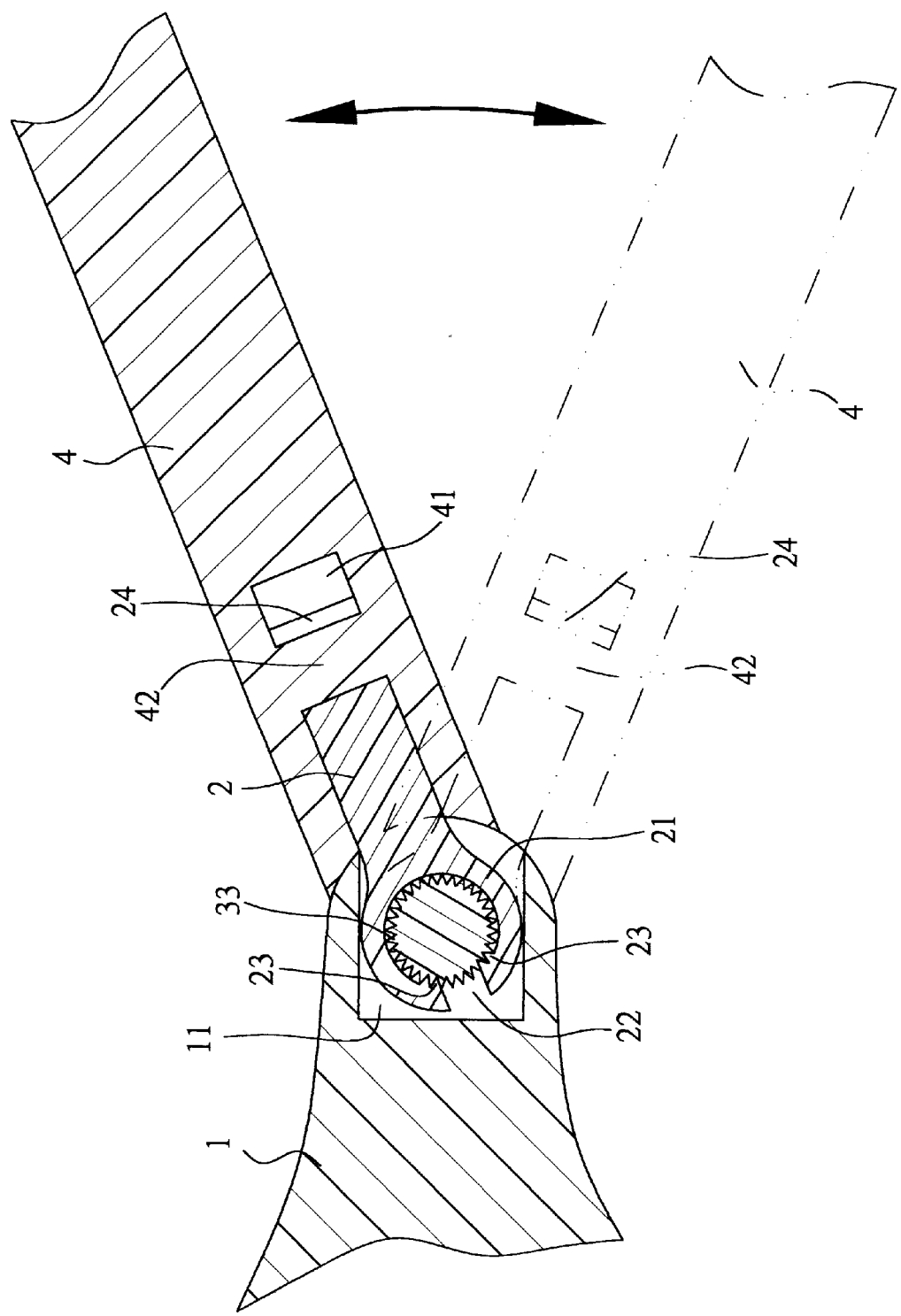
FIG. 5 is a side cross-sectional view of the FIG. 1 assembled arrangement with portions shown in phantom lines for illustrating an angle adjustment operation thereof.

Referring to FIGS. 4 and 5, a fine angle adjustment operation will be described below. In an operating state, user may pivot the temple 4 about the end-piece 1 until a comfortable position is reached. This is effected due to the interfitting of two series of serrations 23 and 33. Also, the interfitting of two series of serrations 23 and 33 acts as a stop for the extent of angular travel that the temple 4 can make with respect to end-piece 1 of eyeglass frame. Moreover, thus described arrangement acts to retain the temple 4 in the adjusted position.

While the invention herein disclosed has been described by means of specific embodiments, numerous modifications and variations could be made thereto by those skilled in the art without departing from the scope and spirit of the invention set forth in the claims.

What is claimed is:

1. Angle adjustment arrangements for temples of a pair of eyeglasses, each arrangement comprising:

an end-piece at either end of an eyeglass frame, the end-piece including a recess, an opening open to an outer surface and perpendicular to the recess, an internal channel having a diameter smaller than that of the opening being in communication with the recess, two opposite slots on a shoulder between the opening and the channel, and an aperture in the channel coaxial with both the channel and the opening;

a connection mechanism including a first circularly shaped bifurcated end having two side pieces spaced apart, a first series of serrations on an inner wall of the first circularly shaped bifurcated end, and a second circularly shaped bifurcated end having two side pieces spaced apart, and the second circularly shaped bifurcated end being opposite and perpendicular to the first circularly shaped bifurcated end;

a fastening mechanism including an outer circular flange, two opposite tabs on an inner surface of the flange, a second series of serrations formed on a circumference of a shank extended inwardly from the flange, and a shaft extended from an inner end being coaxial with the second series of serrations; and a temple including a groove at a front end and a circular post in the groove;

wherein in assembly snap the second circularly shaped bifurcated end into the groove to cause the side pieces of the second circularly shaped bifurcated end to cling around the post for securing the connection mechanism and the temple, snap the first circularly shaped bifurcated end into the recess, and snap the fastening mechanism in the opening with the tabs secured in the slots, the second series of serrations received in the channel, and the shaft clung into the aperture for interfitting one of ridges of the second series of serrations into a space between adjacent ones of the first series of serrations so as to pivotably secure the connection and the fastening mechanisms together, thereby allowing the temple to be pivoted with respect to the end-piece in an operating state.

* * * * *